United States Patent
Mao et al.

(10) Patent No.: US 10,536,088 B2
(45) Date of Patent: Jan. 14, 2020

(54) SWITCHED MODE POWER SUPPLY CONTROLLER

(71) Applicant: Infineon Technologies Austria AG, Villach (AT)

(72) Inventors: Ming Ping Mao, Singapore (SG); Tong Bao, Singapore (SG); Yaw Hann Thian, Singapore (SG); Weifu Yu, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/183,604

(22) Filed: Nov. 7, 2018

(65) Prior Publication Data
US 2019/0149058 A1 May 16, 2019

(30) Foreign Application Priority Data
Nov. 14, 2017 (DE) .................. 10 2017 126 727

(51) Int. Cl.
| | |
|---|---|
| *H02M 1/32* | (2007.01) |
| *H02M 3/157* | (2006.01) |
| *H02M 3/335* | (2006.01) |
| *H02H 7/12* | (2006.01) |
| *H02M 1/08* | (2006.01) |
| *H02M 1/38* | (2007.01) |

(52) U.S. Cl.
CPC ...... *H02M 3/33592* (2013.01); *H02H 7/1213* (2013.01); *H02M 1/08* (2013.01); *H02M 1/32* (2013.01); *H02M 1/38* (2013.01)

(58) Field of Classification Search
CPC ........ H02H 7/1213; H02M 1/32; H02M 1/38; H02M 3/335; H02M 3/33507; H02M 3/33523
See application file for complete search history.

(56) References Cited

U.S. PATENT DOCUMENTS

| | | | |
|---|---|---|---|
| 6,545,883 B2 * | 4/2003 | Xing ................. | H02M 3/33592 363/132 |
| 6,873,191 B2 * | 3/2005 | Dequina ................. | H02M 1/36 327/110 |
| 2004/0012985 A1* | 1/2004 | Ribarich ........... | H02M 3/33569 363/21.02 |
| 2010/0027298 A1* | 2/2010 | Cohen ............... | H02M 3/33592 363/21.14 |
| 2011/0002068 A1* | 1/2011 | Hu .......................... | H02M 1/32 361/18 |
| 2015/0062973 A1 | 3/2015 | Myhre et al. | |

FOREIGN PATENT DOCUMENTS

GB 2455568 A 6/2009

OTHER PUBLICATIONS

Office Action, in the German language, from counterpart German Application No. 102017126727.1, dated Aug. 2, 2018, 7 pp.

* cited by examiner

*Primary Examiner* — Gary L Laxton
(74) *Attorney, Agent, or Firm* — Shumaker & Sieffert, P.A.

(57) ABSTRACT

In some embodiments, upon detecting a fault condition, switching in a switched mode power supply is disabled only after a current switching cycle of the switched mode power supply is completed.

20 Claims, 6 Drawing Sheets

SWITCHED MODE POWER SUPPLY CONTROLLER

This Application claims priority to German Application Number 102017126727.1, filed on Nov. 14, 2017, the entire content of which is incorporated herein by reference.

TECHNICAL FIELD

The present application relates to controllers for switched mode power supplies (SMPS), corresponding switched mode power supplies and associated methods.

BACKGROUND

Switched mode power supplies are frequently used to provide supply voltages to one or more circuit parts. Some switched mode power supplies employ features like power factor correction (PFC). Switched mode power supplies may provide galvanic isolation for example by using a transformer. In such switched mode power supplies, energy is selectively supplied to a primary side of the transformer by operating primary side switches with a switching frequency, often with a pulse width modulation scheme. A switching frequency of such primary side switches is regulated to obtain a desired output voltage needed for a particular application.

On a secondary side, rectifiers may be used in switched mode power supplies. Some implementation use synchronous rectifiers which use switches operated synchronously with primary side switches to provide a DC (direct current) output. Therefore, an example topology of a switched mode power supply (SMPS) system may include a power factor correction circuit, a voltage converter circuit like a LLC converter and a synchronous rectification (SR) circuit. Other types of voltage converters than LLC converters, for example other resonant converters, may also be used.

Switching of primary side switches of such SMPS systems and of synchronous rectifier (SR) switches is in many cases optimized to minimize switching losses. For example, concepts like zero voltage switching (ZVS) for primary side switches or switching at zero current for SR switches may be employed.

Nevertheless, in some situations, a shorter switching cycle, for example a shorter on time of a switch, than in normal operation may occur. One example for such a situation is when the power of a system (supply voltage) is turned off, either due to a power failure or because of a user switching off the system. In such a case, a controller (for example primary side LLC controller) may have its supply voltage reduced quickly below a threshold voltage leading to a reset. This in turn may set output voltages of gate drivers driving gates of primary switches or secondary synchronous rectifier switches to values turning the switches off immediately. Therefore, a last turn-on time at such an event may be shorter than previous turn-on times of a respective switch.

Another situation may occur in case of other fault conditions occurring. Switched mode power supply systems, in particular when used in safety critical environments, may employ various fault detection features like undervoltage detection, overvoltage detection, overcurrent detection etc. In case a corresponding fault condition occurs, switching may also be terminated immediately, leading to shorter turn-on times of one or more switches. For example, a controller for synchronous rectifier switches may be supplied by an output of an LLC converter. When the LLC output is stopped, this controller is reset which may lead to a shorter turn-on time of a synchronous rectifier switch.

Such shortened turn-on times in some situations may lead to voltage oscillations across output capacitors of synchronous rectifier switches (for example implemented as MOSFETs) and consequently to voltage spikes across the synchronous rectifier switch. Such voltage spikes may adversely affect the switch and/or may require the switch to be designed to withstand such voltage spikes, which increases an area required for implementing the switch and costs.

SUMMARY

According to an embodiment, a switched mode power supply controller is provided, comprising:

at least one output terminal to control switching of at least one switch of a switched mode power supply, and a full switching cycle detection circuit configured to disable switching of the at least switch upon receipt of a fault signal only after completion of a current switching cycle.

According to another embodiment, a switched mode power supply controller is provided, comprising:

a first gate pulse generator configured to generate a control signal for a high-side switch of a switched mode power supply, a second gate pulse generator configured to generate a control signal for a low-side switch of the switched mode power supply, at least one trigger connection between the first gate pulse generator and the second gate pulse generator, wherein the first gate pulse generator is configured to start generating a gate control pulse after receiving a trigger signal via the at least one trigger signal connection from the second gate pulse generator indicating that the second gate pulse generator has completed a control pulse, and wherein the second gate pulse generator is configured to start generating a gate control pulse after receiving a trigger signal via the at least one trigger signal from the first gate pulse generator indicating that the first gate pulse generator has completed generation of a gate control pulse, and a control logic configured to interrupt the at least one trigger signal connection in case of a fault condition.

According to a further embodiment, a method is provided, comprising:

detecting a fault condition in a switched mode power supply, and disabling switching in the switched mode power supply in response to detecting the fault condition after a current switching cycle has been completed.

According to yet another embodiment, a method is provided, comprising:

detecting a fault condition, and disabling a trigger connection between a high-side gate pulse generator and a low-side gate pulse generator, wherein each of the high-side gate pulse generator and low-side gate pulse generator is configured to start generating a gate control pulse after receiving a trigger signal via the trigger connection that the other one of the first gate pulse generator and the second gate pulse generator has completed generation of a gate control pulse.

The above summary is merely intended to give a brief overview over some features of some embodiments and is not to be construed as limiting. In particular, other embodiments may include other features than the ones listed above.

DETAILED DESCRIPTION

Figure 1:
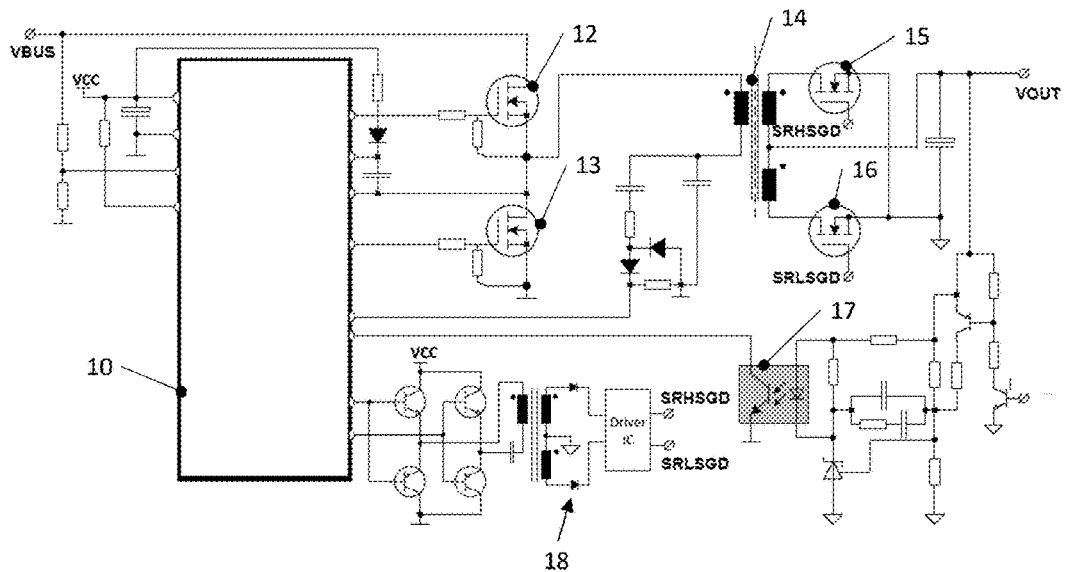
FIG. 1 is a diagram illustrating a switched mode power supply as an example environment.

In the following, various embodiments will be discussed in detail referring to the attached drawings. It is to be noted that these embodiments are given as examples only and are not to be construed as limiting. While for example embodiments may be described as comprising a plurality of features or elements, in other embodiments, some of these features or elements may be omitted and/or may be replaced by alternative features or elements. Also, in addition to the features or elements explicitly shown and described, further features or elements, for example features or elements used in conventional switched mode power supplies or switched mode power supply controllers, may be used. In particular, in the following parts of controllers and switched mode power supplies related to a termination (disabling) of switching in case of some fault or similar conditions will be discussed. Other features of such controllers or switched mode power supply systems, in particular features or elements related to regular operation, may be implemented as in conventional devices.

Features from different embodiments may be combined to form further embodiments. Variations and modifications described with respect to one of the embodiments may also be applied to other embodiments.

In the embodiments shown and described, any direct electrical connection or coupling between elements or components, i.e. connection or coupling without intervening elements, may also be replaced by an indirect connection or coupling, i.e. a connection or coupling comprising one or more additional intervening elements, as long as the general purpose of the connection or coupling, for example to provide a certain kind of signal, to transmit a certain kind of information or to provide a certain kind of control, is essentially maintained. In other words, as long as the general function of a connection or coupling is maintained, the connection or coupling may be modified.

In the following description, reference is made to switches. Switches may be implemented as transistors, for example as MOS transistors. A switch is referred to as being on or closed when it provides a low-ohmic connection between terminals (for example source and drain terminals in case of MOSFET switches). A switch is referred to as off or open when it provides essentially an electric isolation (apart perhaps from undesired leakage currents, which may occur in real devices) between the terminals.

In order to avoid repetitions, in the Figures similar components are marked with the same reference numerals and will not be repeated.

Embodiments described herein provide various techniques for ensuring that a switching cycle (for example turn-on time of a switch) in a switched mode power supply is completed with its full length before switching is terminated.

Turning now to the figures, FIG. 1 schematically illustrates an implementation of a switched mode power supply (SMPS) as an example environment where techniques discussed herein may be implemented. However, this is merely an example for illustration purposes, and techniques discussed herein may be implemented in various types and implementations of switched mode power supplies and switched mode power supply controllers, for example using various types of voltage converters.

The SMPS of FIG. 1 receives an input voltage Vbus and outputs an output voltage Vout. Vbus may be a voltage from a non-regulated power supply like a mains power or may be a voltage already modified by some circuits, for example a power factor correction (PFC) circuit.

The SMPS of FIG. 1 further comprises an LLC converter. The LLC converter comprises a high-side switch 12, a low-side switch 13 and a transformer 14. Switches 12, 13 may be implemented as MOSFET switches as shown. Switches 12, 13 are coupled to a primary side of transformer 14 and are operated by a controller 10 to selectively provide energy to transformer 14. Controller 10 may be implemented as a single integrated chip, but may also be implemented in other ways, for example as an integrated chip together with peripheral circuitry outside the chip. In particular, high-side switch 12 selectively couples the input voltage Vbus to the primary side of transformer 14, and low-side switch 13 selectively couples ground to the primary side of transformer 14.

To generate the output voltage Vout, synchronous rectifier (SR) switches 15, 16 are coupled to a secondary side of transformer 14 as shown. SR switches 15, 16 may be implemented as MOSFET transistors. Switches 15, 16 are controlled by controller 10 via a driver circuit 18 in a synchronous manner to the switching of switches 12, 13 to output a rectified output voltage Vout. Voltage Vout is fed back to controller 10 via a feedback 17 including an optic coupler to provide galvanic isolation. Based on this feedback, controller 10 may control switching of primary switches 12, 13 to adjust the output voltage Vout to a desired value, and switching of synchronous rectifier switches 15, 16 accordingly.

The control of switches 12, 13, 15, 16 during normal operation of the SMPS may be effected in any conventional manner. In addition, controller 10 and/or the SMPS of FIG. 1 may implement techniques as discussed in the following referring to FIGS. 2-13 for ensuring that a switching cycle is completed before switching is terminated (stopped, disabled) in case of fault conditions like undervoltage conditions, overload conditions or a switching off of the SMPS. Apart from the techniques discussed herein and below, controller 10 may be implemented in any conventional manner.

Figure 2:
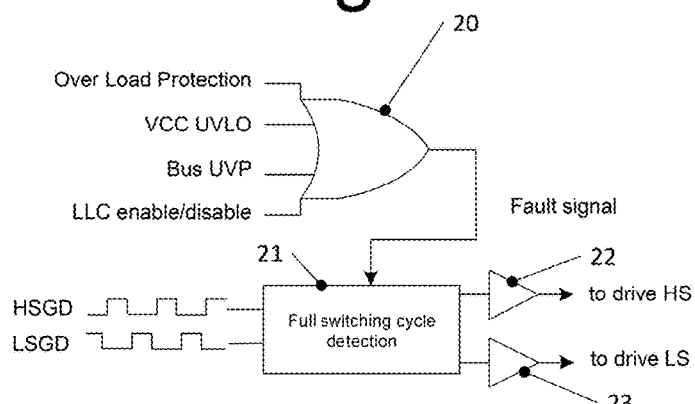
FIG. 2 illustrates parts of a controller according to an embodiment.

FIG. 2 illustrates a block diagram of a part of a controller for a switched mode power supply according to an embodiment. As an example, the circuit of FIG. 2 may be implemented in controller 10 of FIG. 1 or also outside controller 10 in the SMPS of FIG. 1.

In FIG. 2, a signal HSGD used to control a high-side switch like switch 12 of FIG. 1 and a signal LSGD used to control a low-side switch like switch 13 of FIG. 1 are provided to a full switching cycle detection circuit 21. Furthermore, in case of a fault condition, full switching cycle detection 21 receives a fault signal. As symbolized in FIG. 2 by an OR gate 20, such a fault signal may be an overload protection signal when an overload (for example too high current output) is detected, may be an undervoltage signal VCCUVLO detecting an undervoltage in a supply voltage of a controller like controller 10, may be a bus undervoltage protection signal in response to a bus voltage like Vbus in FIG. 1 being below a threshold, or may be due to a disabling of a voltage converter like the LLC converter of FIG. 1 (LLC enable/disable), just to give a few examples. It should be noted that any event or fault signal may be used in response to which switching off switches 12, 13 should be terminated, or in other words, in response to which operation of the SMPS should be terminated or suspended.

Full switching cycle detection circuit 21 in normal operation forwards signals HSGD, LSGD to drivers 22, 23, respectively, to drive high-side (HS) and low-side (LS) switches, respectively. When a fault signal is received indicating that switching should be terminated, full switching cycle detection circuit 21 delays this termination until a current switching cycle of the high-side switch or low-side switch is completed (i.e. a turn-on duration of the switch is maintained at the regular duration, and no switch is switched off "in the middle" of its turn-on time), and after this the switching is terminated by keeping both high-side switch and low-side switch open via drivers 22, 23. In particular, in some implementations, full switching cycle detection 21 may terminate switching at a next dead time between on times of the high-side switch and on times of the low-side switch. A dead time, in this respect, is a time when both high-side switch and low-side switch are open during regular operation. As can be seen from signals HSGD, LSGD in normal operation high-side switch 12 and low-side switch 13 are opened and closed in an alternating manner. If both switches were closed at the same time, a short circuit between voltage Vbus and ground would result. Therefore, between opening one and closing the other ones of the switches, short dead times are introduced to reliably prevent both switches being closed at the same time.

In some embodiments, this may reduce voltage spikes which could result when switching is terminated immediately in response to the fault signal, for example during an on time of a high-side switch or low-side switch.

Figure 3:
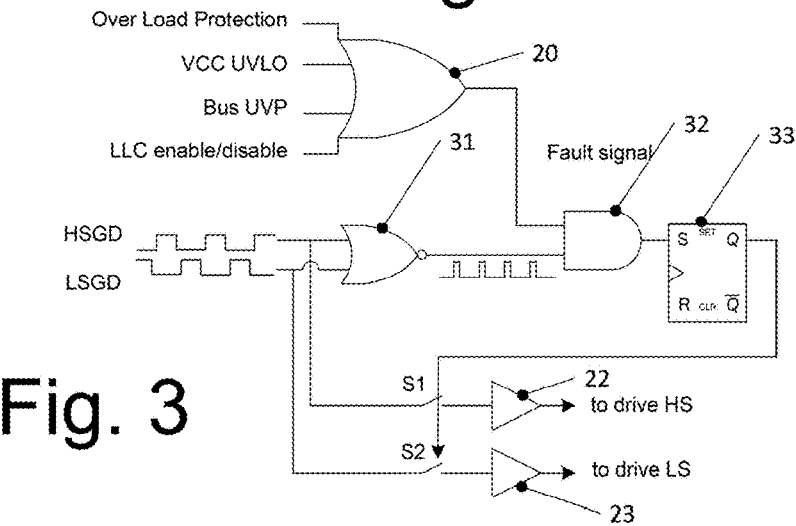
FIG. 3 illustrates a part of a controller according to a further embodiment.

FIG. 3 illustrates a part of a controller like controller 10 according to an embodiment and illustrates an implementation of a full switching cycle detection as illustrated in FIG. 2.

In FIG. 3 a fault signal is provided from various sources as symbolized by an OR gate 20, as explained for FIG. 2. Furthermore, signals HSGD and LSGD as in FIG. 2 for driving a high-side switch and a low-side switch via drivers 22, 23 in normal operation are provided, also as shown in FIG. 2. Signals HSGD, LSGD are provided to drivers 22, 23, respectively, via switches S1, S2, which during normal operation are closed such that high-side switch and low-side switch are driven according to signals HSGD, LSGD. Furthermore, signals HSGD, LSGD are provided to a NOR gate 31. This gate therefore outputs a signal which is high (for example logic 1) when both HSGD and LSGD are low (indicating an open state of the respective switch) and zero otherwise. In other words, the signal output by NOR gate 31 is high during the above-mentioned dead times.

The fault signal and the signal output by NOR gate 31 are provided to an AND gate 32. Therefore, AND gate 32 outputs a high signal level (for example corresponding to logic 1) when the fault signal indicates a fault condition and the signal output by NOR gate 31 indicates a dead time, and outputs zero otherwise. An output of AND gate 32 is provided to a set/reset flip-flop 33. An output of set/reset flip-flop 33 controls switches S1, S2. In this case, when a fault signal indicates a fault condition, set/reset flip-flop outputs a logic 1 at the next dead time opening switches S1, S2 and therefore terminating the switching. In this way, it is ensured that a current switching cycle (on time of high-side switch or low-side switch) is terminated and only then switching is terminated. This in some implementations may prevent or reduce voltage spikes.

Figure 4:
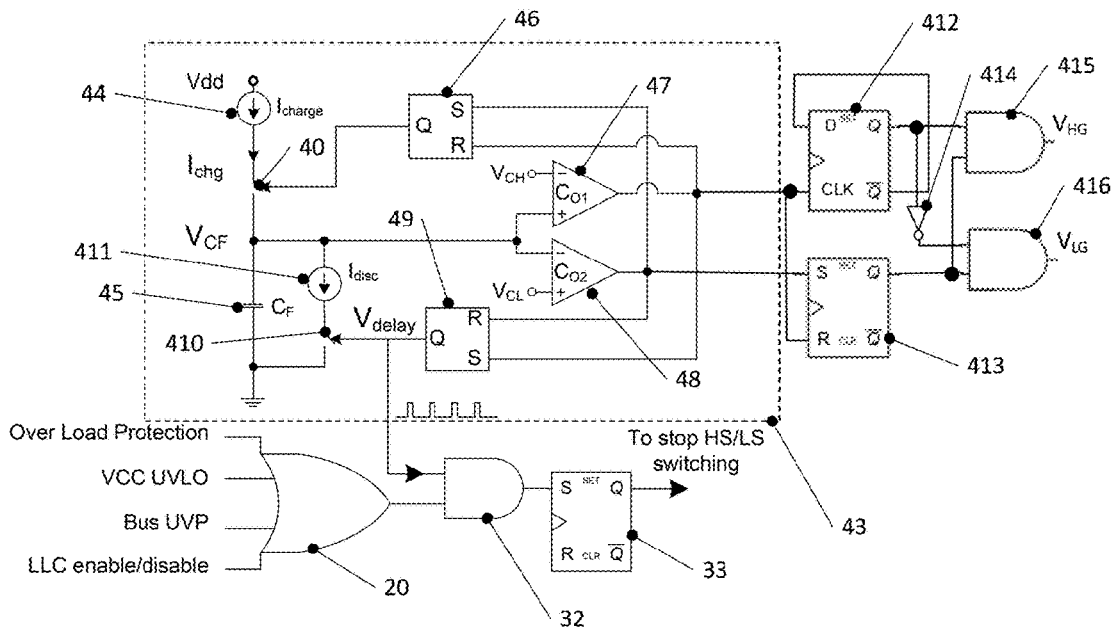
FIG. 4 illustrates a part of a controller according to a further embodiment.

FIG. 4 illustrates a part of a SMPS controller like controller 10 according to a further embodiment. In the embodiment of FIG. 4, again a fault signal is provided from various sources as symbolized by an OR gate 20 to an AND gate 32. An output of AND gate 32 is coupled to set/reset flip-flop 33 already described with reference to FIG. 3, and an output of set/reset flip-flop may terminate switching, for example by opening switches likes switches S1, S2 in FIG. 3.

Furthermore, the embodiment of FIG. 4 comprises a circuit 43. Circuit 43 essentially comprises an oscillator used for generating control signals for high-side switch and low-side switch like signals HSGD, LSGD described previously to directly generate a signal indicative of dead times. Circuit 43 comprises a charging current source 44 which charges a node $V_{CF}$ with a charging current $I_{chg}$ when a switch 40 is closed and a discharging current source 411 discharging node $V_{CF}$ with a current $I_{disc}$ when a switch 410 is closed. The voltage at node $V_{CF}$ is provided to a positive input of a first comparator 47 and a negative input of a second comparator 48. A first threshold value $V_{CH}$ is coupled to a negative input of comparator 47, and a second threshold voltage $V_{CL}$ is coupled to a positive input of comparator 48. An output of comparator 47 is coupled to a reset input of a first set/reset flip-flop 46 and a set input of a second set/reset flip-flop 49. An output of comparator 48 is coupled to a set input of first set/reset flip-flop 46 and a reset input of second set/reset flip-flop 49. An output of set/reset flip-flop 46 controls switch 40, and an output of set/reset flip-flop 49 controls switch 410.

The output of set/reset flip-flop is labeled $V_{delay}$ and is used to control switch 410. At the same time, this signal and the discharging generates the dead times of switching and is used as an input to AND gate 34 as a signal indicative of dead times. The effect is essentially the same as explained with reference to FIG. 3, i.e. that switching is terminated only after completion of a switching cycle, such that the on time is not shortened when a fault condition occurs.

Based on signals output by comparators 47, 48, additionally control voltages $V_{LG}$, $V_{HG}$ are generated. $V_{LG}$ controls a low-side switch (for example corresponding to or being a basis of signal LSGD), and $V_{HG}$ is a corresponding voltage for the high-side switch. Voltages $V_{LG}$, $V_{HG}$ are generated as shown using a D-Latch 412, a set/reset flip-flop 413, an inverter 414 and AND-Gates 415, 416 coupled as shown in FIG. 4.

Figure 5:
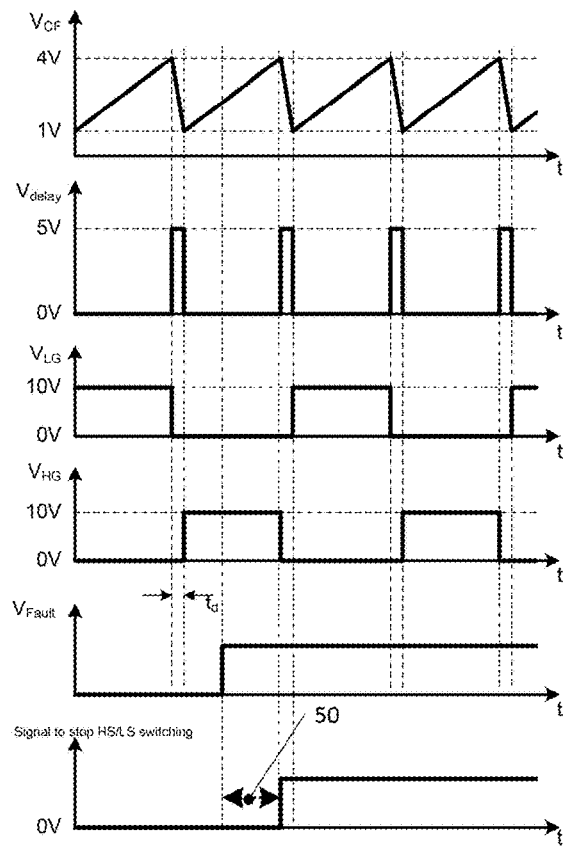
FIG. 5 illustrates example signals for the embodiment of FIG. 4.

FIG. 5 illustrates example signals based on the embodiment of FIG. 4. As can be seen from example voltages $V_{LG}$, $V_{HG}$ in FIG. 5, low-side switch and high-side switch are alternatingly turned on while the voltage $V_{CF}$ rises from 1 V to 4 V in the example of FIG. 5, with dead times during the discharge of $V_{CF}$ corresponding to the voltage $V_{delay}$. A length of the dead time is labeled $t_d$ in FIG. 5.

Additionally, in the example of FIG. 5 at some time a fault occurs leading to a voltage (fault signal) $V_{fault}$. The signal to terminate switching output by set/reset flip-flop 33 is delayed by a time indicated by an arrow 50 until a beginning of a next dead time, as illustrated at the bottom of FIG. 5.

It should be noted that the signal waveforms and voltages explicitly given in FIG. 5 serve merely as non-limiting examples to provide further illustration and is not to be construed as limiting, as other implementations may have other signal waveforms. Furthermore, on times of high-side switch and low-side switch may be varied depending on a desired output voltage of the SMPS.

In some instances, it may occur that a supply voltage to a controller like controller 10 drops so fast that switching would terminate before the next dead time may be reached. In this case, an early detection of dropping supply voltage may be employed to be able to terminate switching only after a current switching cycle has been completed.

Figure 6:
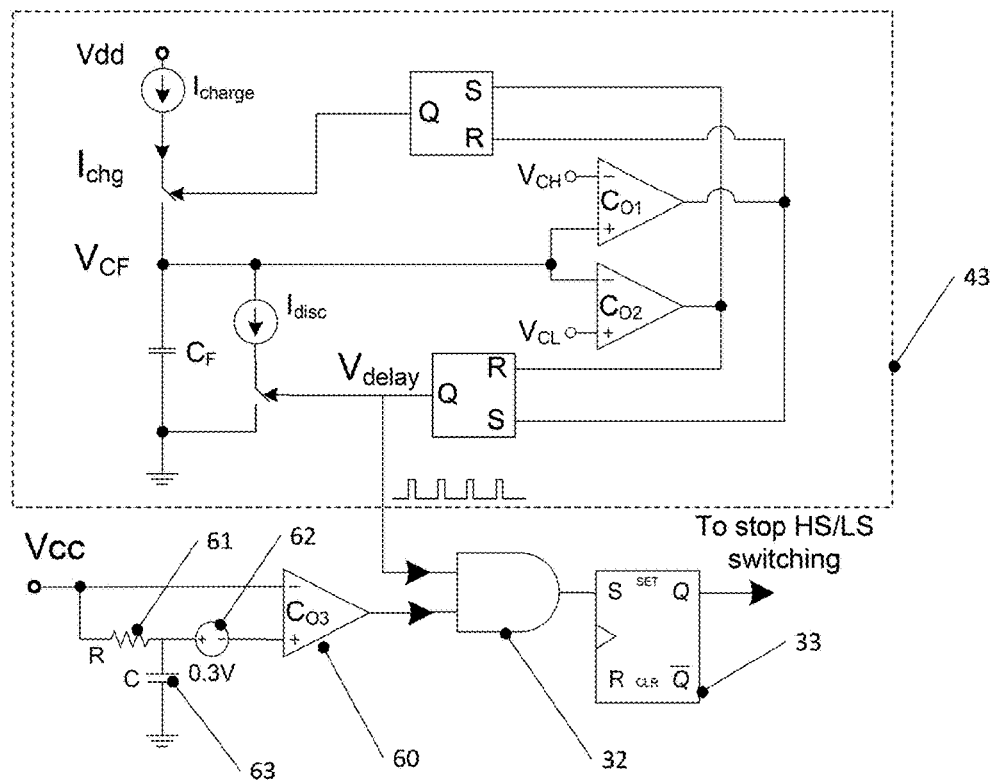
FIG. 6 illustrates a part of a controller according to an embodiment.

FIG. 6 illustrates an example embodiment employing such techniques. In FIG. 6, circuit 43 corresponds to circuit 43 already described referring to FIG. 4 and will not be described again in detail. Furthermore, in FIG. 6, the controller supply voltage Vcc (see for example FIG. 1) is provided to a negative input of a comparator 60 and furthermore via a filter comprising a resistor 61, a capacitor 63 and a voltage source 62 to a positive input of comparator 60. In case of an decrease of voltage above a threshold slope determined by the filter 61, 62, 63, comparator 60 output a fault signal which leads to a termination of switching at a next dead time, i.e. after completion of a next switching cycle. It should be noted that the output of comparator 60 may also be provided to an OR gate to be combined with other fault signals, like OR gate 20 of FIG. 2.

Figure 7:
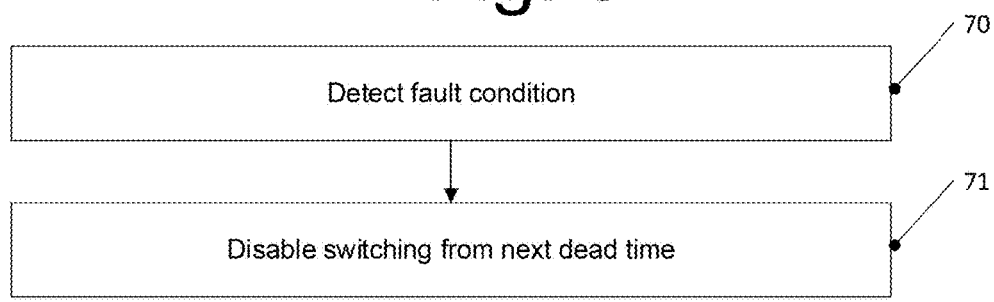
FIG. 7 is a flowchart illustrating a method according to an embodiment.

FIG. 7 is a flowchart illustrating a method according to an embodiment. For ease of reference and better understanding, the method of FIG. 7 will be explained referring to FIGS. 1-6. However, it should be noted that the method of FIG. 7 may also be implemented in other SMPS controllers and SMPS than the ones explicitly shown and described referring to FIGS. 1-6.

At 70 in FIG. 7, the method comprises detecting a fault condition in an SMPS. Such a fault condition may include an overload condition, undervoltages, a switching off of the SMPS or a supply voltage of a controller dropping, as explained with respect to FIGS. 1-6.

At 71, the method comprises disable switching of primary switches of a voltage converter of the SMPS, and optionally also of secondary side switches like synchronous rectifier switches, from a next dead time of the primary side switches. In other words, switching is disabled only after a current switching cycle has been completed, as also explained above.

Figure 8:
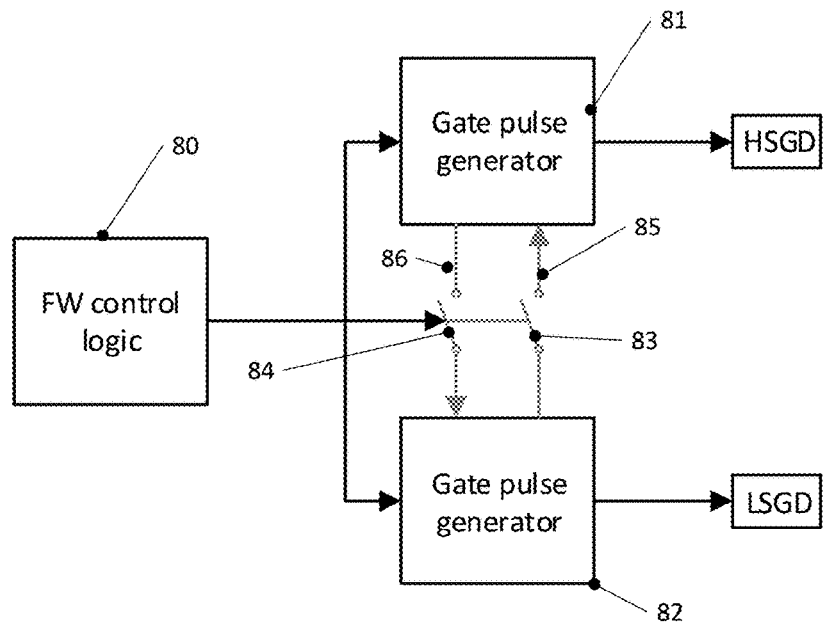
FIG. 8 is a part of a controller according to a further embodiment.

The above embodiments are in particular applicable to analog controller designs or to peripheral circuit designs of digital controllers. In purely digital solutions, other approaches may be taken. An example embodiment for such an approach is shown in FIG. 8. FIG. 8 illustrates a part of an SMPS controller according to an embodiment which may be used for example in digital controller solutions.

The controller of FIG. 8 comprises a first gate pulse generator 81 to generate a signal HSGD for controlling a high-side switch (for example similar to signal HSGD in previously discussed embodiments) and a second gate pulse generator 82 for generating signal LSGD controlling a low-side switch (similar to signal LSGD discussed previously). Signals HSGD, LSGD are then provided to respective drivers to control for example gates of MOS switches similar to drivers 22, 23 of FIGS. 2 and 3.

Gate pulse generator 81, after having completed a pulse (for example at the end of a high time of a pulse indicating a switching on of the respective switch), sends a trigger signal to second gate pulse generator 82 via a connection 86. Upon receiving this trigger pulse, second gate pulse generator 82 starts its own pulse to switch on the low-side switch. Conversely, after the pulse to switch on the low-side switch, second gate pulse generator 82 sends a trigger pulse to first gate pulse generator 81 via a connection 85 indicating that the pulse is finished, upon receipt of which first gate pulse generator 81 starts the next pulse switching on the high-side switch. Instead of separate connections 85, 86, also a single bi-directional connection may be used. In this way, as each gate pulse generator 81, 82 waits for the trigger pulse indicating a completion of a pulse from the respective other gate pulse generator 81, 82 before starting its own pulse, simultaneous on times of both high-side and low-side switch are prevented, and dead times between switching are ensured.

In case a fault condition is detected, a control logic 80 opens switches 83, 84 which are closed during normal operation, thus interrupting connections 85, 86 and preventing the transmission of the above-mentioned trigger pulses from one gate pulse generator 81, 82 to the other gate pulse generator 81, 82. Fault conditions may be fault conditions as discussed previously, for example overload, supply voltage or bus voltage, undervoltage, disabling of the convert, controller supply voltage dropping rapidly etc. Therefore, after one of gate pulse generators 81, 82 has finished its pulse, no trigger pulse reaches the respective other gate pulse generator, and therefore no further pulses are generated and switching is disabled. In this way, similar to previous embodiments, a current pulse is completed before disabling the switching.

Figure 9:
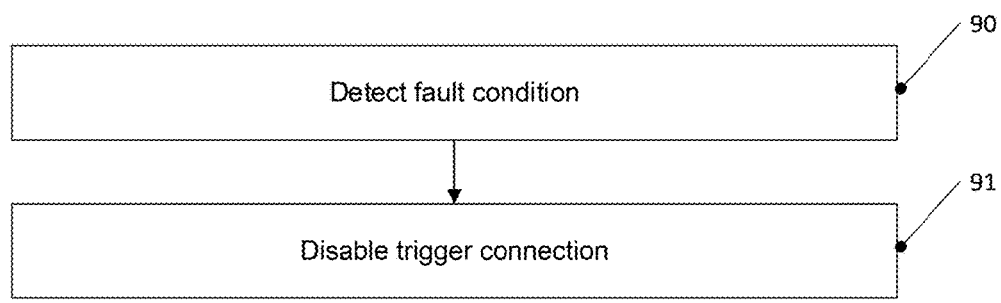
FIG. 9 is a flowchart illustrating a method according to an embodiment.

FIG. 9 illustrates a method according to an embodiment. The method of FIG. 9 may be implemented in the controller of FIG. 8, but may be also implemented independently therefrom. At 90, the method of FIG. 9 comprises detecting a fault condition, for example overload, undervoltage, disabling of converter etc. as discussed previously. At 91, in response to detecting the fault condition, the method comprises disabling a trigger connection between gate pulse generators (for example disabling connections 85, 86 by opening switches 83, 84, respectively, in FIG. 8). This prevents generation of further pulses while ensuring that a current switching cycle is completed.

Figure 10:
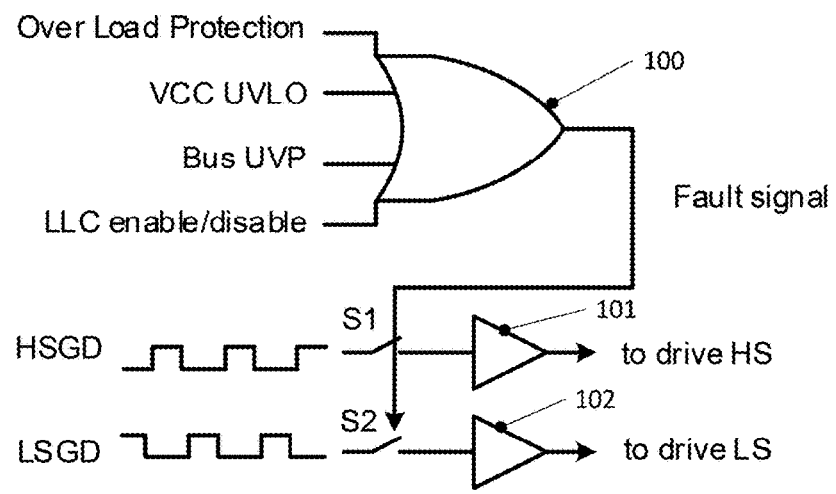
FIG. 10 illustrates a part of a controller according to a comparative example.

Next, embodiments will be further illustrated using a comparative example and example signals. It should be noted that these example signals serve only for further illustration, and signal waveforms may vary depending on implementation and operation conditions of SMPS. For illustration purposes, FIG. 10 shows a comparative example without techniques as disclosed herein for ensuring that a switching cycle is completed for reference purposes. In the comparative example of FIG. 10, various fault signals similar to FIGS. 2 and 3 are combined in an OR gate 100 to form a fault signal. Responsive to the fault signals, switches S1, S2 via which control signals HSGD, LSGD are provided to drivers 101, 102 are opened, such that upon occurrence of a fault signal switching of high-side and low-side switches is disabled immediately. Therefore, switching may for example be disabled in the middle of an on time of a high-side switch or low-side switch.

Figure 11:
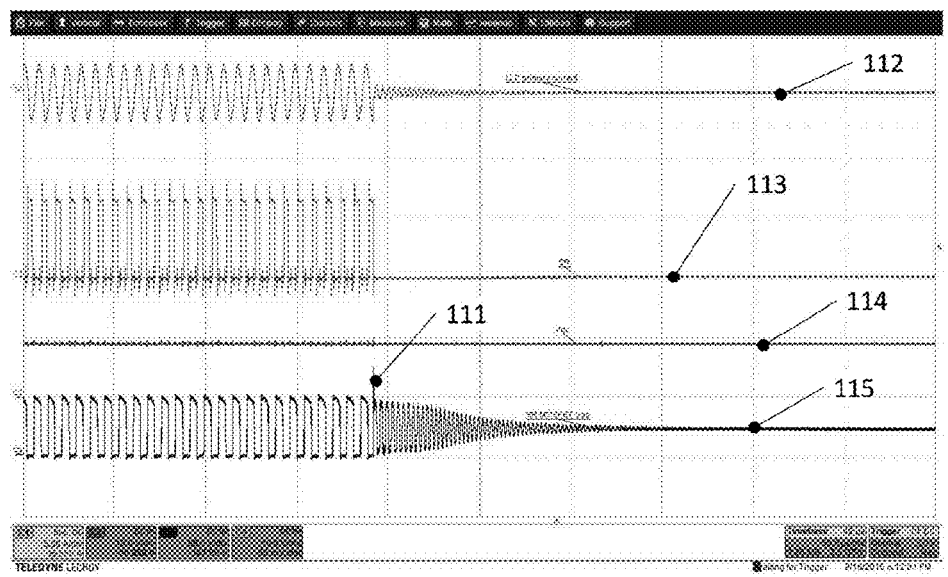
FIGS. 11 to 13 illustrate example signals and simulation results for a controller according to an embodiment and the comparative example of FIG. 10.

FIG. 11 illustrates simulated example signals for a comparative example as shown in FIG. 10 applied to an SMPS as shown in FIG. 1. A curve 112 illustrates a primary LLC current (current through primary side of transformer 14 of FIG. 1), a curve 113 illustrates a gate voltage at synchronous rectifier switches, a curve 114 illustrates a controller supply voltage (Vcc) and a curve 115 shows an example drain source voltage Vds of a synchronous rectifier switch (for example 15, 16 of FIG. 1). As can be seen, when switching is terminated immediately during a switching cycle, a voltage spike 111 occurs. This may damage the synchronous rectifier MOSFETs or require the synchronous rectifier MOSFETs to be designed accordingly such that they can withstand such spikes.

Figure 12:
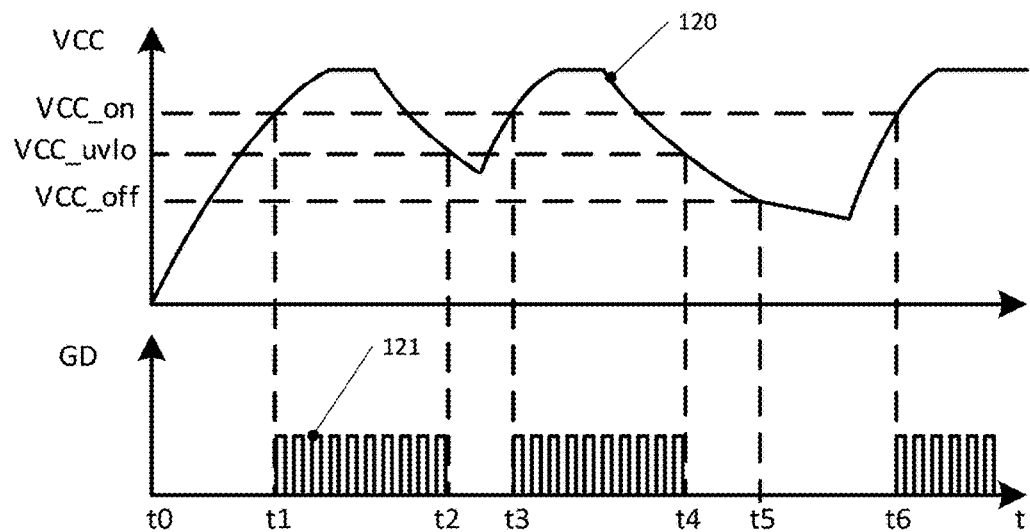

FIG. 12 illustrates example signals which may occur in some embodiments. FIG. 12 shows an example for signals in case of an undervoltage of a controller supply voltage Vcc. The example of FIG. 12 uses three threshold values Vcc_on, Vcc_uvlo_ and Vcc_off.

At startup, the voltage Vcc rises. At t1, voltage threshold Vcc_on is reached, and the controller starts operation, and operation of switches is started as indicated by a switching signal 121 (e.g. HSGD or LSGD). In particular, when at t1 Vcc_on is reached, for example a value of 12 V, the controller will start an initialization process and read firmware parameters and if no fault detected will start switching as indicated by switching signal 121.

Afterwards, between times t1 and t2, the controller operates normally and provides controlled switching of high-side and low-side switches of a SMPS to regulate an output voltage.

At t2, the voltage Vcc for some reason (fault or other) reaches the threshold Vcc_uvlo, for example 9 V. At this point, switching of both primary side switches and synchronous rectifier switches is disabled after a current switching cycle is completed, using techniques as discussed above, e.g. to prevent voltage spikes. The voltage Vcc_uvlo in embodiments is selected such that this supply voltage is still sufficient to supply gate drivers like a high-side gate driver to complete the full switching cycle, i.e. above a switching-off threshold of these drivers. After t2, the voltage is still high enough for the controller to operate. Two different scenarios may happen. In one scenario, the voltage increases again and reaches Vcc_on at t3. In this case, switching is resumed again at t3, provided that no other fault conditions are detected. In the example scenario shown, Vcc drops then again to Vcc_uvlo at t4, and similar to t2, switching is stopped.

In this case, however, the voltage drops further below a threshold Vcc_off. In this case, the controller is totally reset without switching, until at t6 Vcc_on is reached again.

By selecting Vcc_uvlo sufficiently above Vcc_off, in embodiments it is ensured that a full switching cycle may be completed.

Figure 13:
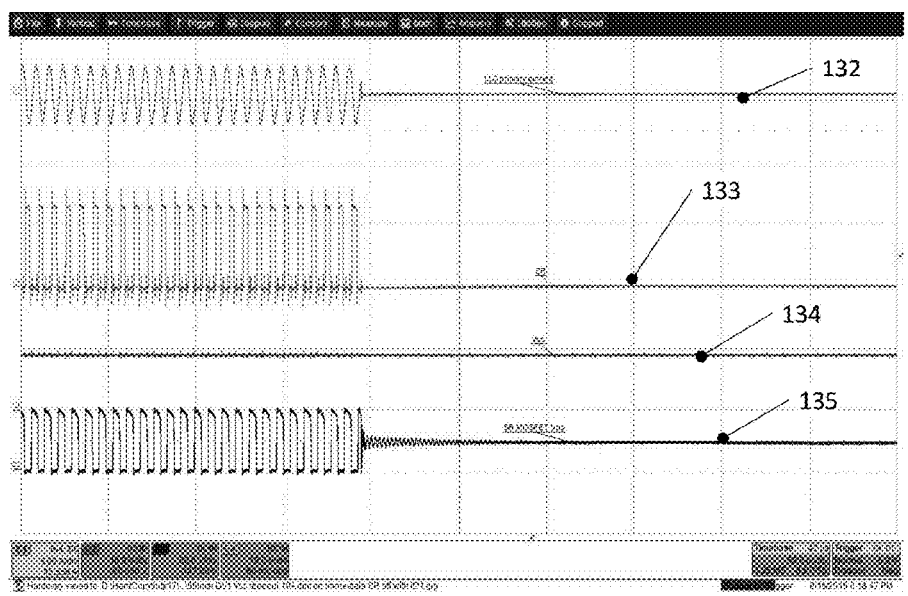

FIG. 13 shows a simulation example where quantities corresponding to the simulated quantities of FIG. 11 are shown, i.e. curve 132 represents an LLC primary current, a curve 133 represents a gate voltage of a synchronous rectifier switch, a curve 134 represents a controller supply voltage and a curve 135 represents an example drain source voltage. In contrast to FIG. 11, in FIG. 13 techniques as disclosed herein were used to ensure disabling in case of a fault condition only after a current switching cycle is completed. As can be seen, in this case no voltage spike occurs in curve 135. This is due to the fact that in case FIG. 11 the synchronous rectifier MOSFET may be switched while a current is applied to it, whereas in the scenario of FIG. 13 zero current switching of synchronous rectifier MOSFETs is maintained, such that a rectification current flowing through a body diode or through the synchronous rectifier switch is naturally reaching zero in normal operation. Therefore, an effect of a reverse recovery of the body diode is small, not leading to a voltage spike.

The invention claimed is:

1. A switched mode power supply controller comprising:
   at least one output terminal to control switching of at least one switch of a switched mode power supply, and
   a full switching cycle detection circuit configured to disable switching of the at least one switch upon receipt of a fault signal only after completion of a current switching cycle,
   wherein the full switching cycle detection circuit comprises a circuit part configured to generate a dead time signal indicative of dead times of switching of the at least one switch, and
   wherein the full switching cycle detection circuit is configured to disable switching when the fault signal indicates a fault condition and the dead time signal indicates a dead time.

2. The controller of claim 1,
   wherein the circuit part is configured to generate the dead time signal comprises a NOR gate, and
   wherein a first input of the NOR gate is configured to receive a high-side gate driver signal controlling a high-side switch of the at least one switch and to receive a low-side gate driver signal to control a low-side switch of the at least one switch.

3. The controller of claim 1, wherein the circuit part configured to generate the dead time signal comprises an oscillator circuit.

4. The controller of claim 1, wherein the at least one switch comprises one or more of a primary high-side switch of a voltage controller, a primary side low-side switch of a voltage controller, or a synchronous rectifier switch.

5. The switched mode power supply controller of claim 1, wherein the fault condition indicates a controller supply voltage drop, an undervoltage condition, a disabling of at least a part of the switched mode power supply, or an overload condition.

6. The switched mode power supply controller of claim 1,
   wherein the full switching cycle detection circuit further comprises an AND gate configured to receive, as inputs, the fault signal and the dead time signal and generate an output signal, and
   wherein the full switching cycle detection circuit is configured to disable the switching based on the output signal.

7. A switched mode power supply controller comprising:
   a first gate pulse generator configured to generate a first control signal for a high-side switch of a switched mode power supply,
   a second gate pulse generator configured to generate a second control signal for a low-side switch of the switched mode power supply,
   at least one trigger connection between the first gate pulse generator and the second gate pulse generator, wherein the first gate pulse generator is configured to start generating a first gate control pulse after receiving a first trigger signal via the at least one trigger signal connection from the second gate pulse generator indicating that the second gate pulse generator has completed a control pulse, and wherein the second gate pulse generator is configured to start generating a second gate control pulse after receiving a second trigger signal via the at least one trigger signal connection from the first gate pulse generator indicating that the first gate pulse generator has completed generation of a first gate control pulse, a controller configured to interrupt the at least one trigger signal connection in case of a fault condition corresponding to a decrease of a controller supply voltage, and a detection circuit configured to detect the decrease in the controller supply voltage, wherein the detection circuit comprises a comparator, and wherein the controller supply voltage is to be coupled to a first input of the comparator and is to be coupled to a second input of the comparator via a filter circuit.

8. The switched mode power supply controller of claim 7, wherein the fault condition is a first condition, and wherein the controller is further configured to interrupt the at least one trigger signal connection in case of a second fault condition indicating an undervoltage condition, a disabling of at least a part of the switched mode power supply, or an overload condition.

9. The switched mode power supply controller of claim 7, wherein the controller is configured to detect the fault condition when the controller supply voltage drops to a first threshold value which is above a second threshold value indicating a controller reset.

10. A switched mode power supply comprising:
a switched mode power supply controller including:
  at least one output terminal to control switching of at least one switch of the switched mode power supply, and
  a full switching cycle detection circuit configured to disable switching of the at least one switch upon receipt of a fault signal only after completion of a current switching cycle,
a voltage converter comprising the at least one switch controlled by the switched mode power supply controller, and
a synchronous rectifier switch at an output of the voltage converter,
wherein the full switching cycle detection circuit comprises a circuit part configured to generate a dead time signal indicative of dead times of switching of the at least one switch, and
wherein the full switching cycle detection circuit is configured to disable switching when a fault signal indicates a fault condition and the dead time signal indicates a dead time.

11. The switched mode power supply of claim 10,
wherein the circuit part is configured to generate the dead time signal comprises a NOR gate, and
wherein a first input of the NOR gate is configured to receive a high-side gate driver signal controlling a high-side switch of the at least one switch and to receive a low-side gate driver signal to control a low-side switch of the at least one switch.

12. The switched mode power supply of claim 10, wherein the circuit part configured to generate the dead time signal comprises an oscillator circuit.

13. The switched mode power supply of claim 10, wherein the fault condition indicates a controller supply voltage drop, an undervoltage condition, a disabling of at least a part of the switched mode power supply, or an overload condition.

14. The switched mode power supply of claim 10, wherein the full switching cycle detection circuit further comprises an AND gate configured to receive, as inputs, the fault signal and the dead time signal and generate an output signal, and wherein the full switching cycle detection circuit is configured to disable the switching based on the output signal.

15. A method comprising:
controlling switching of at least one switch of a switched mode power supply,
generating a dead time signal indicative of dead times of switching of the at least one switch,
detecting a fault condition in the switched mode power supply, and
disabling switching of the at least one switch in the switched mode power supply in response to detecting the fault condition after a current switching cycle has been completed,
wherein disabling the switching of the at least one switch comprises disabling the switching of the at least one switch when a fault signal indicates the fault condition and the dead time signal indicates a dead time.

16. The method of claim 15, wherein detecting the fault condition comprises detecting a controller supply voltage drop, an undervoltage condition, a disabling of at least a part of the switched mode power supply, or an overload condition.

17. The method of claim 15, wherein disabling the switching comprises disabling the switching at a next dead time between a high-side switch switching and a low-side switch switching in response to detecting the fault condition.

18. The method of claim 15, wherein detecting the fault condition comprises detecting a controller supply voltage drop, an undervoltage condition, a disabling of at least a part of the switched mode power supply, an overload condition.

19. A method comprising:
detecting a fault condition by detecting, by a comparator, a decrease in a controller supply voltage by comparing the controller supply voltage to a filtered version of the controller supply voltage, and
disabling a trigger connection between a high-side gate pulse generator and a low-side gate pulse generator in case of the fault condition,
wherein the high-side gate pulse generator is configured to start generating a first gate control pulse after receiving a first trigger signal via the trigger connection indicating that the low-side gate pulse generator has completed generation of a second gate control pulse, and
wherein the low-side gate pulse generator is configured to start generating the second gate control pulse after receiving a second trigger signal via the trigger connection indicating that the high-side gate pulse generator has completed generation of the first gate control pulse.

20. The method of claim 19, wherein the fault condition is a first fault condition, the method further comprising:
detecting a second fault condition by detecting an undervoltage condition, a disabling of at least a part of the switched mode power supply, or an overload condition; and
disabling the trigger connection between the high-side gate pulse generator and the low-side gate pulse generator in case of the second fault condition.

* * * * *